United States Patent Office 3,764,442
Patented Oct. 9, 1973

3,764,442
ULTRASONIC SEAMING APPARATUS
Frank Parry, Monroe, Conn., assignor to Branson Instruments, Incorporated, Stamford, Conn.
Filed Mar. 31, 1972, Ser. No. 240,199
Int. Cl. B23k 1/06; B32b 31/16
U.S. Cl. 156—580                              12 Claims

ABSTRACT OF THE DISCLOSURE

An ultrasonic seaming apparatus in which rotatable anvil disks driven in unison engage one side of a flexible workpiece whose other side is contacted by a resonant horn. Means are provided for independently mounting each anvil disk and adjusting the bias which urges each disk toward the horn. Also, the minimum gap between each anvil disk and the horn is selectively adjustable.

FIELD OF THE INVENTION

The present invention refers to ultrasonic seaming apparatus in which flexible sheet material made entirely or partially of thermoplastic fibers or constituents is subjected to ultrasonic energy for the purpose of seaming, slitting, embossing and the like. Generally, sheet material which is to be exposed to ultrasonic energy as indicated is fed between a rotating anvil disk and an opposed horn surface which is resonant at an ultrasonic frequency whereby the dissipation of sonic energy in the thermoplastic material causes localized melting to provide a fused seam, a fused and cut edge and the like. Ultrasonic seaming apparatus useful for this purpose is shown, for instance, in U.S. Pat. No. 2,633,894 issued to P. B. Carwile dated Apr. 7, 1953 "Plastic Welding"; No. 3,217,957 issued to A. G. Jarvie et al. dated Nov. 16, 1965 "Welding Apparatus"; No. 3,222,235 issued to N. Bucher dated Dec. 7, 1965 entitled "Method of Manufacturing Infusion Bags"; or No. 3,294,616 issued to S. G. Linsley et al. dated Dec. 27, 1966 entitled "Apparatus for Sealing Polymeric Sheet Material by Ultrasonic Energy."

SUMMARY OF THE INVENTION

The teachings of the prior art have been expanded recently to provide an ultrasonic sewing machine which is controlled by an operator, very much like a standard needle and thread sewing machine, for operating on woven or non-woven textile materials made partially or entirely of thermoplastic fibers. Such materials have come into wide-spread use in the recent period of time and their even broader range of application is clearly anticipated. Copending application for U.S. Letters Patent Ser. No. 093,151 in the name of Edward G. Obeda, filed Nov. 27, 1970 entitled "Sonic or Ultrasonic Seaming Apparatus," now U.S. Pat. No. 3,666,599, issued May 30, 1972, describes a control circuit for correlating the velocity of the resonator with the speed of seaming, an essential requirement for an operator controlled sewing machine where the speed of seaming is subject to frequent and rapid changes. This machine has proven extremely valuable and useful in the manufacture of such items as curtains, draperies, the hemming of shirts, blankets, and a host of similar operations and articles. It is quite apparent that with a single anvil disk (or wheel) and an opposing horn only a single seam can be produced at one time. When providing certain hems, for instance, it is desirable that simultaneous seaming be accomplished at spaced intervals. However, the thickness of the material to be seamed is not always identical since due to folds there may be one or more juxtaposed layers of material.

The present invention concerns itself with an arrangement wherein a plurality of independently adjustable anvil disks driven in unison are used in combination with a resonant horn surface and each anvil disk is independently adjustable for a different thickness of material to be seamed. In this manner it is possible to provide simultaneously a plurality of parallel seams in a workpiece, thus reducing the previously time consuming sequential seaming operation to one single path. The anvil construction to be described hereafter includes an arrangement wherein a plurality of rotatable anvil disks have respective peripheral surfaces adapted to engage one side of the workpiece which is to be seamed and responsive to ultrasonic energy imparted by a resonant horn contacting the other side of the workpiece a fused seam is produced in the workpiece. Means are provided for mounting each of the disks for rotation about its respective center and for urging each of the disks independently from one another toward engagement with the horn.

Additional features include separate and individually adjustable resilient means for urging each of the anvil disks toward engagement with the resonating horn, and means for limiting the motion of each disk toward the horn in order to set a minimum spacing between each disk and horn commensurate with the thickness of the material interposed between the disk and horn.

Further and still other features of the present invention will be more readily apparent from the following description when taken in conjunction with the accompanying drawing.

BRIEF DESCRIPTION OF THE SEVERAL VIEWS OF THE DRAWING

FIG. 4 is an elevational perspective view of certain details in FIGS. 1 and 3.

DETAILED DESCRIPTION OF THE INVENTION

Figure 5:
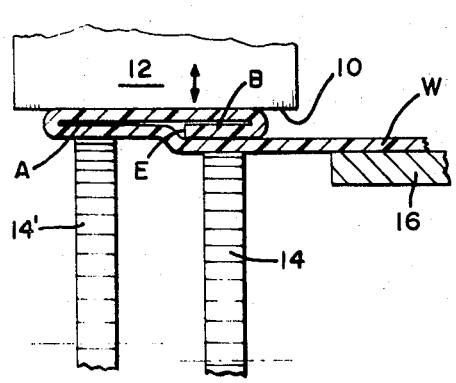
FIG. 5 is an elevational view, partly in section, explaining the purpose and action of the anvil structure covered by the present invention.
Figure 3:
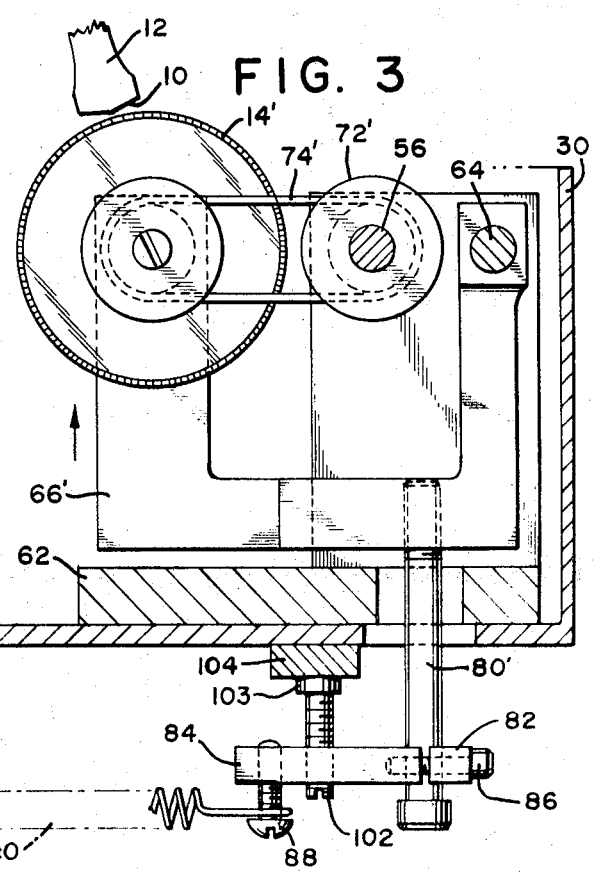
FIG. 3 is a sectional elevational view along line 3—3 in FIG. 1.

Referring now to the figures and FIG. 5 in particular, there is shown a workpiece W one end of which is to be seamed. As is clearly evident, two overlapping layers of material are present at the area A and three overlapping layers are present at the area B since the end E has been tucked in. The upper side of the material is disposed for contact with the frontal surface 10 of a resonant horn 12 which operates preferably in the ultrasonic frequency range as will be described in greater detail hereafter. The underside of the workpiece W is contacted by the periphery of a pair of laterally spaced, rotatably mounted and driven anvil disks 14 and 14' of equal diameter. For obtaining proper seaming, the disks 14 and 14' are urged toward contact with the frontal surface of the horn 12 to bring the workpiece W into engagement with the resonant horn 12. The dissipation of sonic or ultrasonic energy occurring in the workpiece W causes localized fusing and produces a weld in the workpiece at the location of its contact with the horn as brought about by the engagement force exerted by the anvil disks.

It will be apparent that the anvil disk 14 must be spaced slightly farther away from the frontal surface of the horn 12 than the adjacent disk 14' on account of the differences in workpiece thickness which is interposed. If the engagement pressure is too great, excessive fusion occurs in the workpiece and conversely insufficient engagement pressure results in a lack of fusion. Therefore, the purpose of the present invention is to provide independently biased anvil disks, each disk being adjustable for the respective amount of material thickness and the desired degree of fusion. The independent resilient suspension of each anvil disk permits seaming of a workpiece with different layers of material in a single path as may be desired when fabricating inner liners, straps, curtains, etc. Numeral 16 denotes a tabletop which serves to support the non-seamed portion of the workpiece W.

Referring now to FIGS. 1 to 4, numeral 20 identifies a main frame which supports an electro-acoustic converter unit 22 to which a horn 12, also known as resonator, mechanical amplitude transformer, tool, etc. is coupled. The converter unit converts applied electrical high frequency signals, usually in the range from 1 to 100 kHz., but most suitably in the range from 16 to 60 kHz., to mechanical vibration which is apparent at the frontal surface 10 of the horn 12. The frontal surface typically vibrates with an amplitude in the range from 0.0005 to 0.005 inch peak-to-peak. Energy conversion is accomplished by piezoelectric or magnetostrictive transducer means disposed in the converter unit 22. A converter unit suitable for the present purpose is described in U.S. Pat. No. 3,328,610 issued to S. E. Jacke et al. on June 27, 1967 entitled "Sonic Wave Generator." The construction of the foregoing seaming apparatus including the frame 20, mounting of the converter unit 22, controls, etc. is described also in copending application for U.S. Letters Patent Ser. No. 166,462 in the name of Edward G. Obeda et al., filed July 27, 1971 entitled "Ultrasonic Sewing Machine."

The main frame 20 rests upon a bottom pan 30 which contains the mechanisms which form the object of the present invention. An electric motor 32, when energized, provides rotation to a gear reducer 34 coupled to the motor 32 and, in turn, provides rotation to a stub shaft 36 fitted with a pulley 38 affixed to the shaft 36. An endless flexible belt 40 imparts rotation from the pulley 38 to pulley 42 which is affixed to a shaft 44 supported for rotation in bosses 46 and 48 which form a part of the bottom pan 30. A further pulley 50 also affixed to the shaft 44 transmits rotation from the shaft 44 via an endless flexible belt 52 to pulley 54 which is pinned to the shaft 56, causing shaft 56 to rotate responsive to the speed of the motor 32. The shaft 56 is journalled in a U-shaped frame comprising spaced side plates 58 and 60 and a bottom plate 62 which is fastened to the bottom panel of the pan 30. The U-shaped frame comprising the plates 58, 60 and 62 supports also a non-rotating shaft 64, secured by setscrew 65, which is used as a pivotal support for a plurality of anvil supports 66 and 66'. Although only two of these supports are shown, it will be apparent that there may be several more of these in a lateral array, the width of the horn 10 being correspondingly enlarged.

Figure 1:
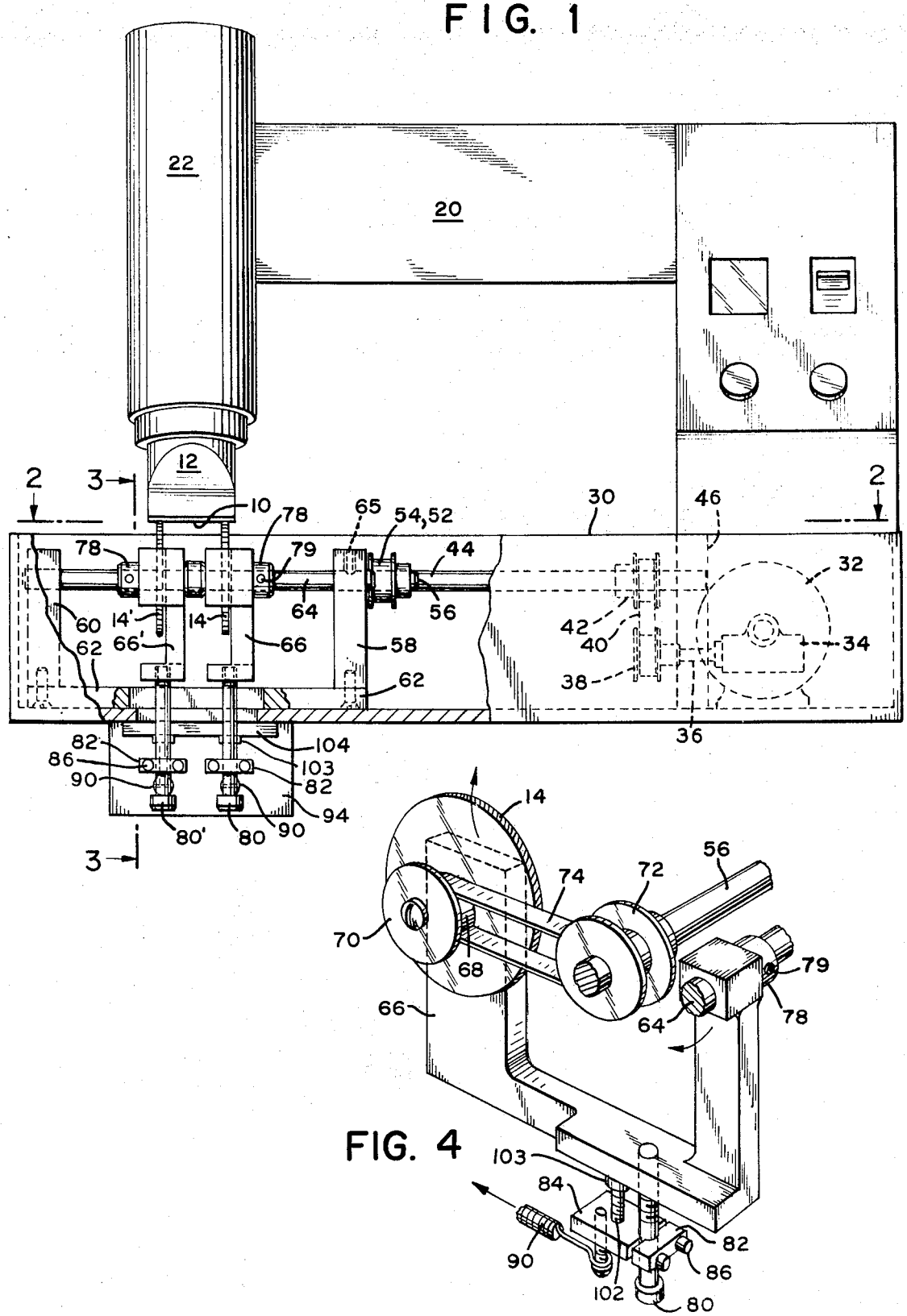
FIG. 1 is an elevational view, partly in section, of a preferred embodiment of the ultrasonic seaming apparatus.
Figure 2:
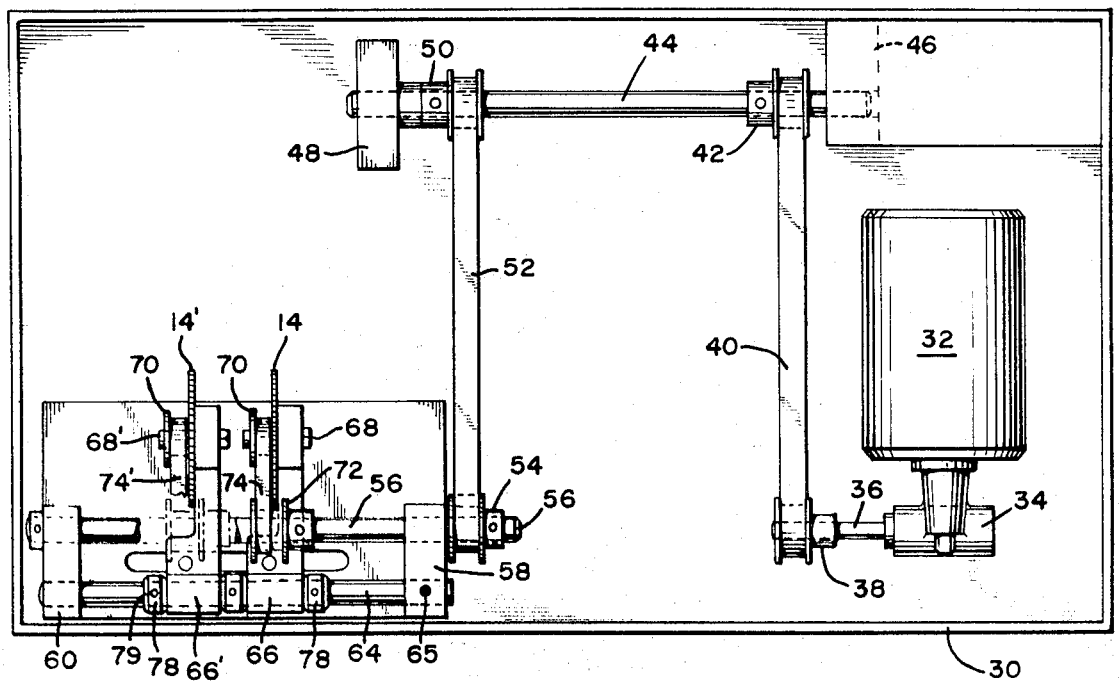
FIG. 2 is a plan view taken along line 2—2 in FIG. 1.

As seen more clearly in FIGS. 2 and 4, each respective anvil support 66, 66' has a first leg pivotally supported about the shaft 64 and a second leg which supports a respective rotatable stub shaft 68 or 68', each fitted with the respective anvil disk 14 or 14' and an end washer 70. The rotatable drive shaft 56 is provided with a plurality of pulleys 72, 72', each including a hub and a setscrew for being secured to the shaft for transmitting rotation via a respective flexible drive belt 74 or 74' to the associated stub shaft and anvil disk 14 or 14'. The lateral spacing between the anvil supports 66 and 66' and hence the lateral spacing between the anvil disks 14 and 14' is adjustable by sliding the anvil supports axially along the shaft 64. The position of the anvil supports is secured in place by a set of collars 78, each having an associated setscrew 79.

It will be apparent that each anvil support is positionable laterally by loosening the respective setscrew 79, FIG. 4, and the setscrew associated with the pulleys 72 or 72'. The respective anvil disk 14, 14' is then moved to the desired position and the associated setscrews tightened upon the respective shafts to lock the anvil support in its lateral position (setscrew 79) and to provide for the transmission of rotation (setscrew of pulley 72, 72'). As will be apparent, moreover, each anvil disk is independently pivotable about the axis of the shaft 64 to accommodate different workpiece material thicknesses and each anvil disk, furthermore, while being driven from a common shaft, shaft 56, is set into rotation via its own drive pulley and transmission belt.

Another salient feature of this invention concerns the independent bias means acting upon each anvil disk in the direction toward the horn to provide for engagement pressure between the workpiece and the horn. The biasing force acting upon a respective anvil disk is adjustable and means are provided to limit the motion of each anvil disk toward the horn in order to set a minimum gap spacing. These features are apparent by referring to FIGS. 1, 3 and 4. Each anvil support 66, 66' is provided in its base portion with a threaded hole which is fitted with a respective bolt 80, 80'. The shank of each bolt is engaged by a two-part clamp 82, 84 held in place by a set of screws 86. The clamp part 84 is fitted with a screw 88 which secures one end of a helical tension spring 90. The other end of the spring is anchored in a partially threaded rod 92 extending through a bore in a stationary block 94. An internally threaded knob 96 engages the threaded end of the rod 92 and upon turning the knob 96, which is urged by the spring 90 against the end surface of the block 94, the tension of the spring 90 is increased or decreased. In this manner, the force urging the associated anvil support to pivot about the axis of shaft 64 and toward engagement between the anvil disk and the horn frontal surface is adjustably variable.

The pivotal motion of each anvil disk and anvil support toward the frontal surface 10 of the horn 12 is limited by an adjustment mechanism which includes a screw 102 threadedly engaging the clamp part 84 and screw head 103 abutting against a stop plate 104 which is attached to the underside of the pan 30. Upon rotating the appropriate screw 102 the pivotal motion of the associated anvil disk toward the horn frontal surface 10 is adjusted and a minimum gap can be set. The minimum gap setting feature is highly desirable in order to prevent crushing, cutting or excessive welding of delicate sheet material which is fed between the anvil disks 14 and 14' and the frontal surface 10 of the horn 12.

The anvil disks 14 and 14' feeding the workpiece through the seaming station are driven via motor 32 at a speed responsive to the variable speed control actuated by an operator. Also, as stated hereinabove, the speed of the anvil disks is coordinated with the velocity of the horn in order to provide for speed-correlated power dissipation in the workpiece, thereby achieving optimum fusing or sealing between the juxtaposed layers of material.

The disks carry at their periphery embossed designs or patterns which provide a pleasing appearance of the welded seam. Such patterned wheels are known from the prior art, see for instance, British Pat. No. 1,167,549, and need not be described further.

What is claimed is:
1. An ultrasonic seaming apparatus comprising:
   a plurality of rotatable anvil disks having respective peripheral surfaces adapted to engage one side of a workpiece which is to be seamed responsive to ultrasonic energy imparted by a resonant horn in contact with the other side of the workpiece;
   support means for mounting each of said disks for rotation about its respective center;
   bias means coupled to said support means for urging each of said disks independently from one another toward engagement with the horn, and drive means coupled for rotating said plurality of disks substantially at the same rotational speed.

2. An ultrasonic seaming apparatus as set forth in claim 1, said bias means including resilient means.

3. An ultrasonic seaming apparatus as set forth in claim 2, said bias means including adjustable resilient means for each disk.

4. An ultrasonic seaming apparatus as set forth in claim 1, and means for limiting the motion of each disk toward the horn whereby to set a minimum spacing between each disk and horn.

5. An ultrasonic seaming apparatus as set forth in claim 1, each of said disks being mounted for rotation about its axis to a respective support, and such supports being mounted for pivotal motion to cause the associated disk to move relative to the horn.

6. An ultrasonic seaming apparatus as set forth in claim 1, and means operatively associated with said support means for adjustably spacing said disks from another in a lateral direction.

7. An ultrasonic seaming apparatus comprising:
a horn adapted to resonate and provide ultrasonic energy to a sheet-like workpiece in contact therewith;
a plurality of rotatably mounted anvil disks disposed for engaging the other side of the workpiece for urging such workpiece in contact with said horn and feeding such workpiece past said horn;
a plurality of supports, each mounting a respective disk for rotation about its center;
a first shaft;
means cooperatively associated with said supports for supporting said supports on said first shaft and for providing pivotal motion of said supports about said first shaft;
locking means cooperatively associated with said first shaft and said supports for securing the lateral spacing of said supports from one another along the axis of said shaft;
a second shaft adapted to be driven at a speed commensurate with the feed speed of the workpiece past said horn;
means coupling said second shaft to each of said disks for rotating each of said respective disks at the rotational speed commensurate with that of said shaft;
adjustable bias means coupled between each of said supports and a stationary frame for selectively adjusting the force effective upon each of said supports and urging the respective disk toward engagement with said horn, and
adjustable means coupled to each of said supports for limiting the pivotal motion of the associated support toward said horn whereby to adjust the minimum gap between a respective disk and said horn.

8. An ultrasonic seaming apparatus as set forth in claim 7, a respective shaft mounting each disk to the associated support, and said means coupling comprising a respective drive belt coupled between said second shaft and a respective shaft mounting such disk.

9. An ultrasonic seaming apparatus as set forth in claim 7, said adjustable means for limiting the pivotal motion comprising screw means.

10. An ultrasonic seaming apparatus as set forth in claim 7, said adjustable bias means comprising a spring and means for varying the force exerted by said spring.

11. An ultrasonic seaming apparatus comprising:
an electro-acoustic converter unit adapted to receive electrical high frequency energy and provide in response to such energy mechanical vibrations at an ultrasonic frequency;
a horn coupled to said converter unit for providing at a frontal surface thereof ultrasonic energy to a workpiece coupled to said surface;
a plurality of laterally spaced anvil disks, the periphery of each disk disposed for engaging the workpiece and urging such workpiece toward contact with said frontal surface;
means for driving said disks in unison whereby to feed such workpiece through the space between said disks and said frontal surface;
adjustable bias means coupled to said disks for selectively adjusting the bias effective upon each disk urging said disks in a direction toward said frontal surface, and
adjustable means effective upon each of said disks for selectively limiting the motion of each disk toward said frontal surface whereby to set a minimum gap of a respective disk relative to said frontal surface.

12. An ultrasonic seaming apparatus comprising:
a plurality of rotatable anvil disks having respective peripheral surfaces adapted to engage one side of a workpiece which is to be seamed responsive to ultrasonic energy imparted by a resonant horn in contact with the other side of the workpiece;
support means for mounting each of said disks for rotation about its respective center;
means coupled to said disks for urging each of said disks independently from one another toward engagement with the horn, and
drive means coupled for rotating said plurality of disks substantially at the same rotational speed.

References Cited
UNITED STATES PATENTS

| | | | |
|---|---|---|---|
| 2,633,894 | 4/1953 | Carwile | 156—580 |
| 3,530,027 | 9/1970 | Nuckols, Jr. | 156—580 |
| 3,666,599 | 5/1972 | Obeda | 156—580 |

DOUGLAS J. DRUMMOND, Primary Examiner

U.S. Cl. X.R.

228—1